United States Patent [19]
Kohler

[11] Patent Number: 5,857,069
[45] Date of Patent: Jan. 5, 1999

[54] TECHNIQUE FOR RECOVERING DEFECTIVE MEMORY

[75] Inventor: Ross Alan Kohler, Allentown, Pa.

[73] Assignee: Lucent Technologies Inc., Murray Hill, N.J.

[21] Appl. No.: 775,236

[22] Filed: Dec. 30, 1996

[51] Int. Cl.$^6$ .................................................. G06F 11/00
[52] U.S. Cl. ............................... 395/182.03; 395/185.07
[58] Field of Search ..................... 395/182.03, 182.19, 395/183.18, 182.13, 185.02, 185.07; 371/2.2, 21.6, 40.2, 40.4, 40.13, 70; 365/200, 201

[56] References Cited

U.S. PATENT DOCUMENTS

| | | | |
|---|---|---|---|
| 3,222,653 | 12/1965 | Rice | 395/182.03 |
| 3,350,690 | 10/1967 | Rice | 395/182.03 |
| 3,781,826 | 12/1973 | Beausoliel | 371/2.2 |
| 4,249,253 | 2/1981 | Gentili et al. | 371/21.6 |
| 4,453,248 | 6/1984 | Ryan | 395/182.03 |
| 4,488,298 | 12/1984 | Bond et al. | 395/182.03 |
| 4,785,453 | 11/1988 | Chandran et al. | 371/70 |
| 4,884,271 | 11/1989 | Concha et al. | 371/40.2 |
| 5,140,597 | 8/1992 | Araki | 371/40.2 |
| 5,228,046 | 7/1993 | Blake et al. | 395/182.03 |
| 5,488,691 | 1/1996 | Fuoco et al. | 395/182.03 |
| 5,509,018 | 4/1996 | Niijima et al. | 371/10.2 |

*Primary Examiner*—Robert W. Beausoliel, Jr.
*Assistant Examiner*—Scott T. Baderman

[57] ABSTRACT

A technique for improving the manufacturing yield of data processing memory. A memory array contains a known pattern of single-bit defects. Specifically, a first group of the memory cells contain flawless storage devices which are capable of being set to either of two possible stable states, i.e., a binary "1" or a binary "0." A second group of the memory cells contain the single-bit defects. These storage devices of the second group are capable of being set to only one of the two possible stable states. Before data is loaded into the memory, a coder codes the data such that bits to be loaded into the memory cells with bit defects match the state of the bit defect. The coder also generates code bits capable of decoding the coded data. A memory input-output circuit loads the code bits and the coded data blocks into the memory cells. When the memory input-output circuit accesses the memory, it passes the coded data blocks and the code bits to a decoder which uses the code bits to decode the data blocks.

19 Claims, 2 Drawing Sheets

TECHNIQUE FOR RECOVERING DEFECTIVE MEMORY

FIELD OF THE INVENTION

This invention relates in general to the field of electronic data processing, and more particularly to a technique for recovering defective memory.

BACKGROUND OF THE INVENTION

In the early stages of developing processes for manufacturing semiconductor devices, large quantities of defective semiconductor structures are fabricated, tested and usually discarded. These discarded devices can represent a significant monetary drain on the development process. Of course, the primary goal is to develop manufacturing processes that produce structures with no defects. However, even some highly refined processes often produce structures that contain a few defective elements. If such partially defective structures could be salvaged, a significant savings may be achieved.

Specifically, in the semiconductor manufacturing field, data processing devices are often produced with semiconductor memories having some defective elements. These defective devices often represent significant overhead costs. More specifically, complex semiconductor memories with thousands of storage cells may be fabricated with some relatively small number of cells that are incapable of storing data bits in both binary states. For example, when testing semiconductor memories, fabricators often find some memory cells to be "stuck" in one of their stable states. Of course, a flawless memory cell is one that can store information in either one of two stable states, i.e., a binary "1" or a binary "0. " If one or only a few such memory cells are "stuck," the memory will usually be rejected. If this memory is embedded in a data processor die then that die may also be rejected. Consequently, those concerned with the development and manufacture of semiconductor devices, particularly complex data processors with embedded memory, have recognized that manufacturing yield may be significantly improved if these discarded memories could be recaptured.

SUMMARY OF THE INVENTION

This invention provides a technique of recapturing defective memories having a known pattern of single-bit defects. To attain this, the present invention provides structures and processes which manipulate the input data prior to loading it into the memory so that the stored data bits are a function of the pattern of single-bit defects. Code bits are generated and used to properly read the loaded data when the memory is accessed.

One aspect of the invention comprises a data processing device with a memory having a plurality of memory cells each having a storage device for storing bits. In a first group of the memory cells, the storage devices are capable of being set to either of two possible stable states. A second group of the memory cells has storage devices which are capable of being set to only one of either of the two possible stable states. A coder codes the input data such that bits to be loaded into the second group of memory cells match the state of the memory cells into which they are to be loaded. The coder generates code bits capable of decoding the coded input data. When data is read from the memory, a decoder uses the code bits to decode the accessed coded data to obtain the original input data.

According to another aspect of the invention, a memory array containing a known pattern of defective cells is divided into two groups of cells. A first group of the memory cells contain flawless storage devices which are capable of being set to either of two possible stable states, i.e., a binary "1" or a binary "0." A second group of the memory cells contain the bit defects such that these memory cells can be set to only one of the two possible stable states. The input data is loaded into the memory in blocks such that each memory cell contains no more than a single-bit defect. Before data is loaded into the memory, a coder codes the data such that data bits to be loaded into the memory cells of the second group match the state of the bit defect. The coder also generates code bits capable of decoding the coded data. A memory input-output circuit loads the code bits and the coded data blocks into the memory cells. When the memory input-output circuit accesses the memory array, it passes the coded data blocks and the corresponding code bits to a decoder, which uses the code bits to decode the data blocks so that the original input data can be retrieved.

Still another aspect of the invention comprises a method of processing data bits in a digital circuit having a memory with a plurality of memory cells. The memory cells of a first group are capable of being set into two stable states. The memory cells of a second group have bit defects such that these memory cells are capable of being set into only one of either of the two stable states. The method includes storing a data structure of the memory specifying the location and state of the memory cells having the bit defects. Reading a block of data having a plurality of bits. Determining the block address of the block of data wherein the block address specifies the location in the memory at which the block is to be loaded. Comparing the contents of the block of data to the data structure. Coding the block of data such that the bits to be loaded at the bit defects match the state of the memory cells containing the bit defects. Generating code bits useful when decoding the blocks of data. Loading the blocks of data and the code bits into the memory.

These and other features of the invention are described in the following description of illustrative embodiments of the invention when taken with the drawings. The scope of the invention, however, is limited only by the claims appended hereto.

DETAILED DESCRIPTION OF ILLUSTRATIVE EMBODIMENTS OF THE INVENTION

Figure 1:
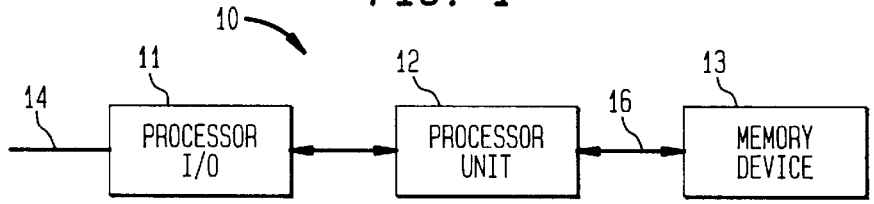
FIG. 1 shows a simplified block diagram of an illustrative embodiment of a data processor in accordance with the invention.
Figure 2:
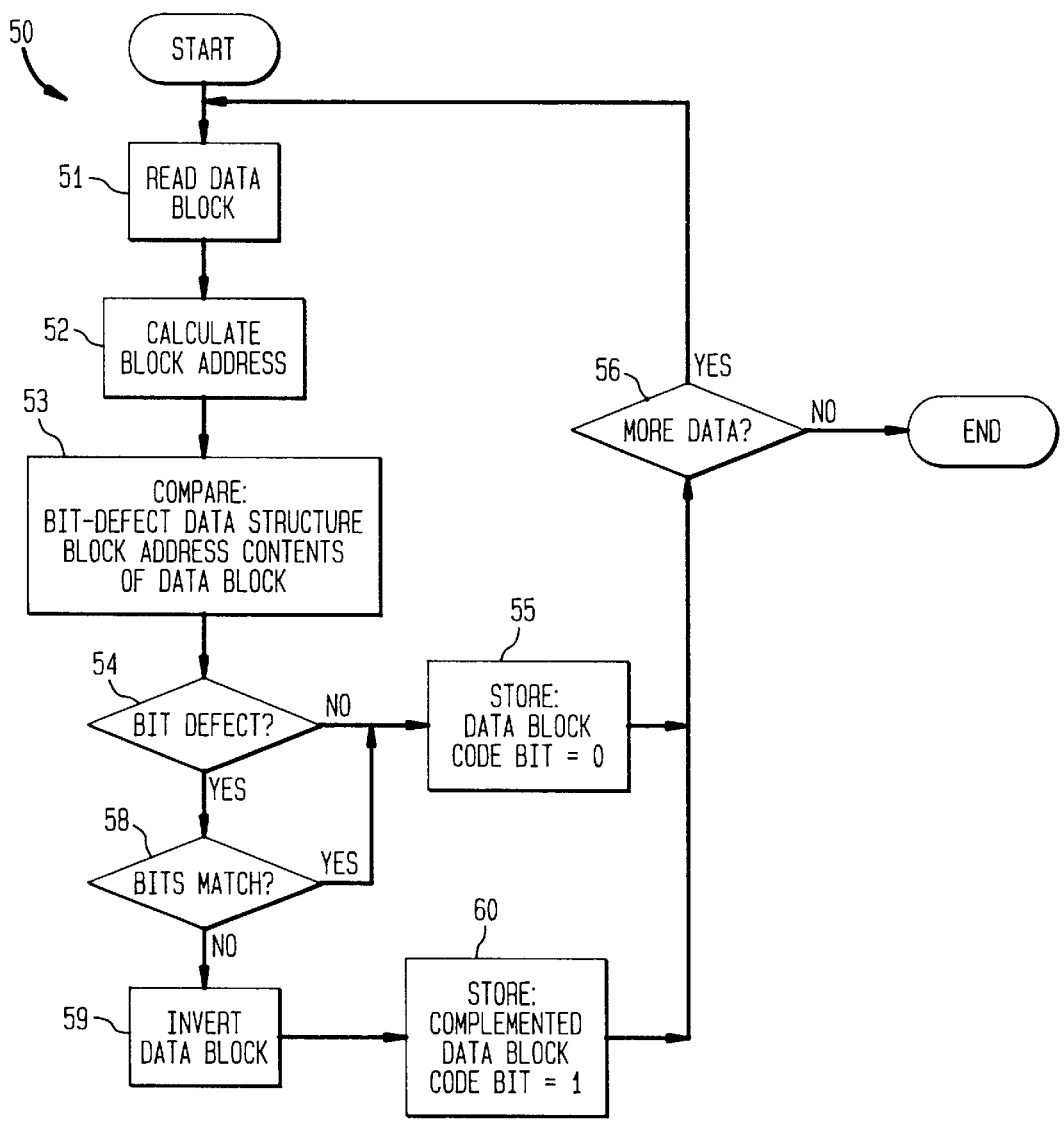
FIG. 2 is a flow diagram of a data storage process performed by the FIG. 1 data processor.

Referring now to the drawings, FIG. 1 shows data processor 10, an integrated circuit manufactured using any known process, comprising processor input-output (I/O) circuit 11, processor unit 12 and read-write memory device 13. Processor terminal 14, which may include conventional connector pins, connects I/O circuit 11 to external equipment (not shown). Processor unit 12, which may be constructed from conventional circuits, such as a clock circuit, an arithmetic/logic unit, a math coprocessor, bus interface circuits, etc. (not shown), connects to memory device 13, which may be embedded memory, via processor bus 16. The flow diagram of FIG. 2 depicts a high-level data storage process which processor unit 12 executes when loading data to memory device 13 in accordance with the present invention. The schematic of FIG. 3 shows details of memory device 13 and its connections to processor bus 16.

Figure 3:
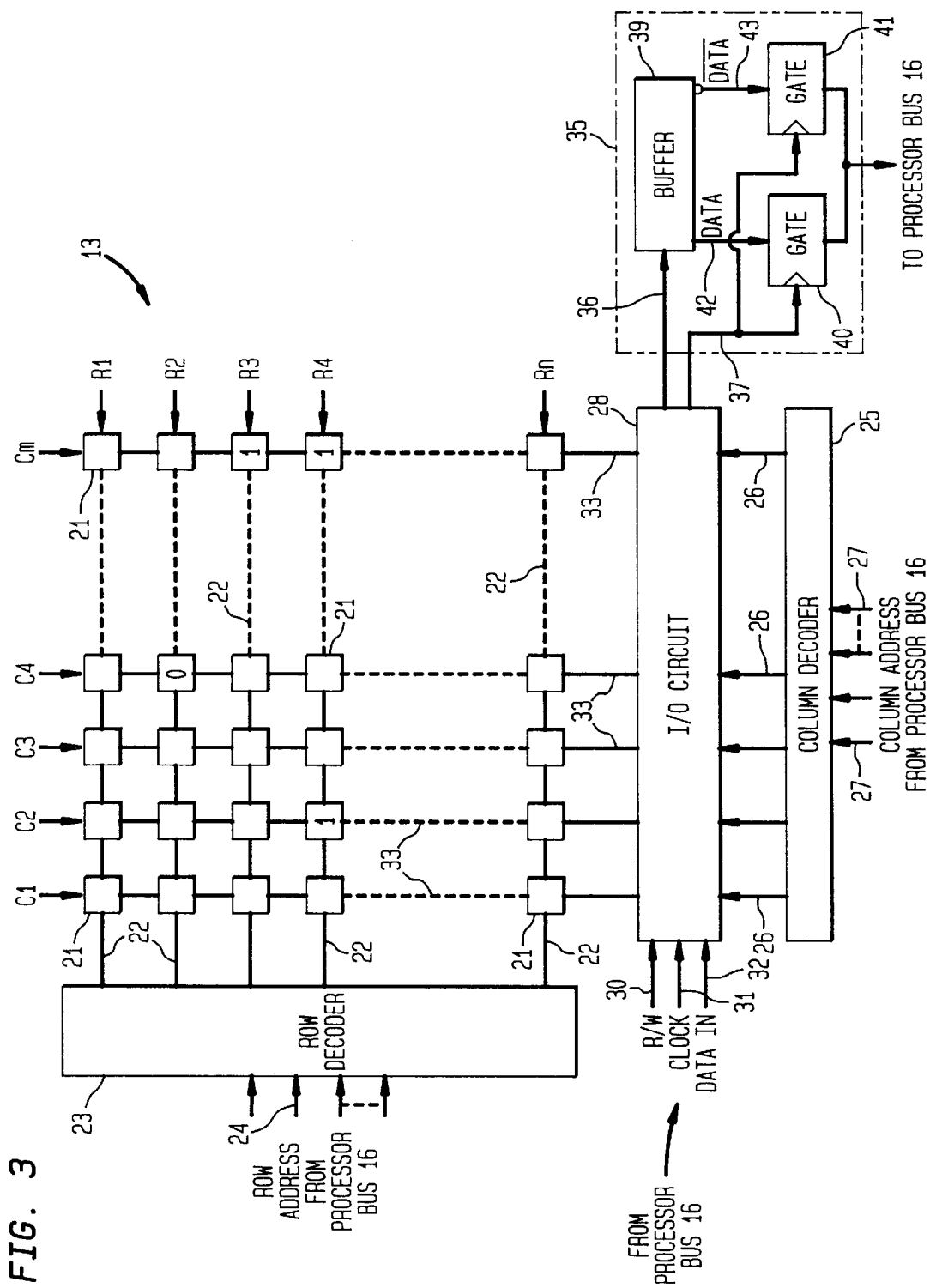
FIG. 3 is a schematic block diagram showing a portion of the FIG. 1 data processor in greater detail.

With respect to FIGS. 1 and 3, memory device 13 comprises an (m×n) rectangular array of memory cells 21 having m columns C1–Cm and n rows R1–Rn. Memory cells 21 each contain a conventional two-state storage element capable of storing a bit of digital data, i.e., a binary "1" or a binary "0." Memory device 13 contains n row-select lines 22, one for each of rows R1–Rn. Each row-select line 22 connects to all m memory cells 21 in its row. Memory device 13 further includes row decoder 23 with n outputs that connect to the respective n row-select lines 22. The inputs of row decoder 23 include row-address lines 24, which come from processor unit 12 via processor bus 16.

Memory device 13 also contains column decoder 25 the output of which comprises m column-select lines 26 connected to memory input/output (I/O) circuit 28. The inputs to column decoder 25 include column-address lines 27, which come from processor unit 12 via processor bus 16. Read-write data lines 33, one for each of columns C1–Cm, connect memory I/O circuit 28 to memory cells 21. Each data line 33 connects to all n memory cells 21 in its respective column.

Processor unit 12 provides three inputs to memory I/O circuit 28 via processor bus 16, namely read-write (R/W) control 30, clock 31 and data input 32. Memory I/O circuit 28 transmits data to processor unit 12 via decoder 35. Decoder 35 includes buffer 39, and transmission gates 40 and 41, which have a common output that connects to processor bus 16. The input to buffer 39 comes from I/O circuit 28 via data output line 36. Buffer 39 includes two outputs, true data output 42, which outputs the data as it is received on line 36, and complemented data output 43, which simultaneously outputs the complement of the data on true data output 42. Transmission gates 40 and 41 selectively transmit data from buffer outputs 42 and 43 to processor unit 12 via their common output and processor bus 16. Transmission gates 40 and 41 have enable terminals connected to memory I/O circuit 28 via gate control line 37.

Memory cells 21 may contain conventional read-write digital storage devices. For example, each memory cell 21 may comprise a conventional combination of a select transistor and a storage capacitor (not shown). In that case, digital data would be stored as a charge on the capacitor, e.g., a charged capacitor would represent a binary "1" and a discharged capacitor a binary "0." The present invention is also applicable to other types of read-write digital memory, including multiple types of memory, such as for example, EPROM, EEPROM, FLASH memory, SRAM and DRAM.

Processor unit 12 accesses memory device 13 by providing row and column addresses respectively to lines 24 and 27. Row decoder 23 would decode the row address and actuate the appropriate row-select line 22. For the transistor-capacitor example described above, the actuated row-select line 22 would turn on the transistors in all memory cells 21 of that row, thereby connecting the associated storage capacitors to the read-write data lines 33. Essentially, each transistor would function as an on-off switch that selectively connects a capacitor to its read-write data line 33. Additionally, column decoder 25 decodes the column addresses and inputs these addresses to memory I/O circuit 28, which in turn activates the corresponding data lines 33. The simultaneous activation of one row-select line 22 and one or more data lines 33 identifies the intersecting memory cells 21 for reading or writing.

When loading data to memory device 13, processor unit 12 transmits a write control signal to R/W control 30, and data signals to data input 32. In response, memory I/O circuit 28 uses the column addresses to direct the received data signals to the appropriate data lines 33. In the transistor-capacitor example, this response causes data lines 33 to charge or discharge the storage capacitors of the activated cells 21 in accordance with the bits to be loaded.

When reading data from memory device 13, processor unit 12 transmits a read control signal to R/W control 30 while monitoring the common output of gates 40 and 41. Memory I/O circuit 28 responds to the read control signal by connecting the appropriate data lines 33 to decoder 35 via data lines 36 and gate control line 37. In a manner to be described below in greater detail with respect to FIG. 2, code bits on gate control line 37 selectively enable gates 40 and 41, so that decoder 35 transmits either a true version or a complemented version of the stored data to processor unit 12.

As described above, there may be instances where one or more rows R1–Rn contain a defective memory cell 21 in the sense that that memory cell is stuck in one of its two possible stable states, i.e., it is stuck in either the binary "1" state or the binary "0" state. The stability of the affected cell may be good in the sense that it can readily hold the state in which it is stuck. For the transistor-capacitor example described above, a manufacturing defect in the insulation layer of a capacitor may cause that capacitor to be stuck in an uncharged state. FIG. 3 illustrates a situation where memory cells 21 at locations (Rn,C2), (R3,Cm) and (R4,Cm) are stuck in a binary "1" state, and memory cell 21 at location (R2,C4) is stuck in a binary "0" state, while memory cells 21 at the remaining locations may be set to either state. The present invention contemplates that in many such instances, special row coding (or column coding) of the data may be used to "work around" or compensate for the defective memory cells 21.

An illustrative row-coding technique begins with the testing and selection of suitable memory devices 13. The memory fabricator selects for recovery those memory devices 13 that meet the following conditions:

a. all defective memory cells 21 are stable, i.e., defective cells 21 can be readily set and stabilized in at least one of the two possible data states, i.e., a binary "1" or a binary "0";

b. there are only single-bit defects, i.e., no more than one memory cell 21 per row is defective; and c. a predetermined column, reserved as a code-bit column, contains no defective memory cells 21, e.g., column C1 in FIG. 3 is free of bit defects and functions as the code-bit column.

After selecting suitable memory devices 13, the fabricator uses the test results to generate and store in memory device 13 a cell-defect data structure showing the locations of the defective memory cells 21. The cell-defect data structure records, e.g., in the form of a look-up table, both the location of and the contents in each defective memory cell 21, (e.g., cell 21 at location (R3,C1) is stuck as a binary "1").

When loading data into memory device 13, processor unit 12 partitions the data into blocks. For each block of data, processor unit 12 determines a block address in memory device 13 where the data in the block will be stored, hereinafter the block address, and compares that block address and the data in the block to the previously stored cell-defect data structure. Depending on the location and state of the defective cells 21 when compared to the state of the data bit to be stored into that cell, processor unit 12 codes the data blocks in the following manner:

a. if the memory cells 21 at the block address contain no bit defects, a true version of the data block is loaded into memory cells 21 at the block address and a code bit (e.g., a binary "0") for that block is loaded into a code-bit memory cell 21 to indicate that a true version of the current data block is stored;

b. if the memory cells 21 at the block address contain a defective memory cell 21 and if the "stuck" state of the defective memory cell matches the corresponding bit in the data block, a true version of the data in the data block is loaded and a code bit (e.g., a binary "0") for that block is loaded into a code-bit memory cell 21 to indicate that the corresponding data block is a true version; and c. if the "stuck" state of a defective memory cell 21 does not match the state of the corresponding bit in the data block, a complemented version of the data in the data block is loaded into the memory cells 21 at the block address and a code bit (e.g., a binary "1") for that block is loaded into the appropriate code-bit memory cell 21 to indicate that the memory cells at that block address contain a complemented version of the data in the data block.

The FIG. 2 flow diagram illustrates data storage process 50, which processor unit 12 executes when loading data into memory device 13 using the illustrative row-coding technique. The program instructions of data storage process 50 may be stored in memory device 13, or in an embedded read only memory, or in an external memory device. For illustrative purposes only, the following description of the FIG. 2 flow diagram assumes that data storage process 50 uses a row-coding technique in which an (m−1)-bit data block plus one code bit fill each row R1–Rn. Also for illustration, the description assumes that processor unit 12 loads the data blocks successively into rows R1–Rn and that column C2 holds the first data bits, column Cm holds the last data bits, and column C1, which has no bit defects, holds the code bits.

With reference to all of the figures and with particular reference to FIG. 2, data storage process 50 begins with read STEP 51 in which processor unit 12 reads a first (m−1)-bit data block. Processor unit 12 then calculates in STEP 52 the block address, i.e., the row and column addresses, for the current data block. Processor unit 12 then executes STEP 53, comparing the previously stored bit-defect data structure with the contents of the current data block and its block address. In decision STEP 54, processor unit 12 determines whether or not the bit-defect data structure shows that a defective memory cell 21 exists at the block address. If there are no defective memory cells 21 at the block address, processor unit 12 exits the "NO" path of STEP 54. Since row R1 does not contain a bit defect, processor unit 12 executes store STEP 55 setting the code bit to a binary "0," and transmitting the code bit, the block address and a true version of the data or bits in the current data block to memory device 13. With respect to the illustrative example and FIG. 3, execution of STEP 55 results in loading a true version of the current (first) data block into memory cells 21 at locations (R1,C2) through (R1,Cm), and loading a code bit, i.e., a binary "0" or true code bit, into location (R1,C1).

Processor unit 12 next executes decision STEP 56 to determine if additional data must be loaded. If there is no more data, data storage process 50 ends. If more data must be loaded, data storage process 50 returns to read STEP 51 and the process proceeds for the next data block.

When executing decision STEP 54 for the second data block, processor unit 12 identifies that there is a bit defect at the block address, i.e., at row R2. Consequently, data storage process 50 exits the "YES" path of decision STEP 54 and proceeds to decision STEP 58. In STEP 58, processor unit 12 looks for a match between the bit defect at row R2 and the corresponding bit in the current data block. If processor unit 12 finds a bit match, the current data block can be loaded into the memory cells 21 at the block address without modification such as inverting the data. Specifically, row R2 contains a bit defect, i.e., a binary "0," at column C4 (see FIG. 3). However, the bit defect will not pose a problem if processor unit 12 determines that the corresponding bit in the data block is also a binary "0." Assuming that this is the case for the current (second) data block, data storage process 50 exits STEP 58 via its "YES" path. Processor unit 12 then executes store STEP 55, setting a code bit to a binary "0," and loading the code bit into location (R2,C1) and a true version of the data or bits in the data block into the remaining columns of row R2. Data storage process 50 proceeds to decision STEP 56 and the process continues for the next (third) data block.

If processor unit 12 finds, in STEP 58, a bit mismatch, processor unit 12 executes invert STEP 59 on the current (third) data block, thereby inverting the data block and forcing a bit match. Processor unit 12 can now load the complemented data (i.e. the data that is the logical complement to the original data), in the data block, into the block address with the assurance that the bit of data loaded into the defective memory cell 21 will have the same state as the state of the data stuck in the defective memory cell.

More specifically and with respect to FIGS. 2 and 3, memory cell 21 located at the intersection of row R3 and column Cm contains a bit defect (the memory cell is "stuck" in a binary "1"). Assuming that the corresponding bit in the current data block, i.e., the last bit in the third data block, is a binary "0," a bit mismatch will be detected, causing data storage process 50 to exit the "NO" path of STEP 58 and proceeds to invert STEP 59 where processor unit 12 inverts the bits of data in the data block. Next, processor unit 12 executes store STEP 60, setting a code bit to a binary "1," and transmitting the code bit, the block address and the complemented version of bits of data in the data block to memory device 13. With the last bit in the data block inverted from a binary "0" to a binary "1," a match now exists between it and the bit defect, i.e., the binary "1" at location (R3,Cm). When data storage process 50 exits store STEP 60, it proceeds to decision STEP 56 and then to read STEP 51 where the process continues for the remaining data blocks, loading the code bits in column C1 and the data bits in the other columns.

When processor unit 12 reads data from memory device 13, decoder 35 uses the code bits located in column C1 to decode the data while passing the data to processor unit 12. Specifically, when reading data in memory device 13, processor unit 12 transmits a read control signal to R/W control 30, a row address to row-address lines 24 and a column address to column-address lines 27. In response, row decoder 23 decodes the row address and activates the appropriate row-select line 22. Column decoder 25 decodes the column address and activates the appropriate column-select lines 26. In response, memory I/O control 28 accesses data in the activated row via data lines 33, causing the data bits to be placed on data lines 36 while the code bit appears on gate control line 37. Buffer 39 simultaneously provides two versions of the accessed data bits, a true version at true data output 42 and a complemented version at complemented data output 43. The corresponding code bit tells decoder 35 which version should be applied to its output.

For example, a binary "0" code bit on gate control line 37 enables gate 40 and disables gate 41 so that a true version of the stored data passes to processor unit 12. A code bit set to a binary "1" enables gate 41 and disables gate 40 so that a complemented version of the stored data passes to processor unit 12.

Numerous modifications and alternative embodiments of the invention will be apparent to those skilled in the art in view of the forgoing description. For example, while the present invention has been described for use with data storage in general, it may have special utility for use with data that represents stored programs. Program memory in a processor is special in that the memory contents are usually known at the time of loading the program data into the memory, unlike data memory in which individual data words can change randomly. Consequently, a more efficient, low-overhead technique appears easier to achieve in the case of embedded program memory. For example, speed of writing program data into memory is generally not a tight requirement as it can be in the case of writing non-program data.

The present recovery techniques essentially require an ability to perform two functions, namely a test ability to identify bit defects and their stable states, and a computational ability to compare and manipulate data to be stored. These functions could be implemented in an off chip personal computer or other tools commonly used for memory programming, could be built into the processor die containing the program memory, hardware and/or software. If these functions are built in, the inventive techniques would be particularly well suited for handling new defects that arise during the life of the memory as it is reloaded with new data.

Additionally, while the present description illustrates a row-coding technique, column-coding techniques are also possible. In a column-coding implementation of the present invention, the code bits may be held in a secondary memory, separate from memory device 13, and used to set logic for selecting true or complemented versions of the stored data. There would be no loss of speed in this embodiment as compared to a conventional memory, but there will be additional overhead for the separate memory and the code bits. Of course, in either row coding or column coding, extra storage elements are required to store the code bits for each data block.

In many implementations of the present invention, there may be little or no loss in speed when reading data form memory device 13 as compared to conventional memory. Accessing the memory in a row-coded embodiment could be slower than in the column-coding embodiment because the code bits are accessed concurrently with and at the same speed that the data block is accessed, and decoder 35 will need each code bit to select the appropriate data version to be put on processor bus 16. But most clocked systems may not see this as a delay because decoder 35 can be designed to make its selection quickly during a memory recovery clock phase.

Another advantage of row coding is that the coding can be performed in smaller units than in a whole physical row as in the above illustration. For example, a code bit could be stored as an extension of each word or smaller unit, allowing the program memory to tolerate as much as one bit defect per word or smaller unit.

Obviously many other modifications and variations of the present invention are possible in the light of the above teachings. For example, when testing and selecting suitable memory devices, a memory fabricator may select those devices having more than a single-bit defect, i.e., more than one memory cell per row being defective. In addition, the method of detecting defective memory according to the present invention may be performed at times other than during memory fabrication, i.e., during power-up of the memory device, and during initiation. Similarly, the present invention is not limited to memory used by or on the processors described herein, it could also provide detection for memory used by or on digital signal processors, microprocessors or other controllers.

Accordingly, this description is to be construed as illustrative only, and is for the purpose of teaching those skilled in the art the best mode of carrying out the invention. Details of the technique may be varied substantially without departing from the spirit of the invention and the exclusive use of all modifications which come within the scope of the appended claims is reserved.

What is claimed is:

1. A data processing apparatus comprising:
    a memory having a plurality of memory cells each having storage circuitry for storing a bit therein, said storage circuitry of a first group of said memory cells capable of being set to two stable states, and said storage circuitry of a second group of said memory cells capable of being set to only one of either of said two stable states;
    coding circuitry for coding data such that each said bit to be stored in said second group matches the stable state of said memory cell into which each said bit is to be stored, and for generating code bits capable of decoding said data; and
    decode circuitry connected to said memory for reading data from said memory and decoding said data in response to said code bits.

2. The apparatus of claim 1 wherein said coding circuitry inverts said bits stored in said second group of said memory cells.

3. The apparatus of claim 2 wherein said coding circuitry includes circuitry for loading said data and said code bits into said memory.

4. The apparatus of claim 3 wherein said decode circuitry includes circuitry responsive to said code bits for transmitting either a complemented or a true version of said data read from said memory.

5. A data processing apparatus comprising:
    a memory having a plurality of memory cells each having storage circuitry for storing a bit therein, said storage circuitry of a first group of said memory cells capable of being set into two stable states, and said storage circuitry of a second group of said memory cells having at least one bit defect such that each said memory cell of said second group is capable of being set into only one of either of said two stable states;
    a control circuit connected to said memory for accessing selected segments of said memory, each said segment having a plurality of said memory cells, said control circuit having write means for loading data blocks into each said segment and read means for reading data blocks stored in each said segment;
    code means connected to said write means for coding said data blocks such that said bits to be stored in said second group of said memory cells match the state of said memory cell of said second group into which a corresponding one of said bits is stored, and for generating code bits capable of decoding said data blocks; and
    decode circuitry connected to said read means and responsive to said code bits for decoding said data blocks being read from said memory.

6. The apparatus of claim 5 wherein said code means inverts said bits to be stored in one of said segments containing said at least one bit defect and wherein said bit being loaded does not match the state of said memory cell containing said bit defect.

7. The apparatus of claim 6 wherein each said segment has no more than one of said at least one bit defect and each said data block includes at least one of said code bits for decoding the data block.

8. The apparatus of claim 7 wherein said decode circuitry includes means connected to said read means and responsive to said code bits for transmitting either a complemented or a true version of said data read from said memory.

9. The apparatus of claim 8 wherein said memory includes a bit-defect map means for specifying the location and state of said memory cells having said at least one bit defect, and said code means includes means for comparing said data blocks to said bit-defect map for coding said data blocks and generating said code bits.

10. An integrated circuit comprising:
   a processor input-output circuit having terminal means for outputting data from said integrated circuit and for receiving data inputted to said integrated circuit;
   a memory having a plurality of memory cells each having storage circuitry for storing a binary bit therein, said storage circuitry of a first group of said memory cells capable of being set into two stable states, and said storage circuitry of a second group of said memory cells having at least one bit defect such that each said memory cell of said second group is capable of being set into only one of either of said two stable states;
   a control circuit connected to said memory for accessing selected segments of said memory, each segment having a plurality of said memory cells, said control circuit having write means for loading data blocks into each said segment and read means for reading data blocks stored in each said segment;
   a data processor connected to said processor input-output circuit and said control circuit, said data processor having code circuitry for coding said data blocks such that said bits to be stored in said second group of said memory cells match the state of said memory cell into which each said bit is stored and for generating code bits capable of decoding said data blocks; and
   decode circuitry connected to said read means and responsive to said code bits for decoding said data blocks being read from said memory.

11. An integrated circuit of claim 10 wherein said code circuitry inverts said bits of each said data block to be stored in one of said segments containing one of said at least one bit defect that do not match said bit being stored therein.

12. An integrated circuit of claim 11 wherein each said segment has no more than one of said at least one bit defect and each said data block includes at least one of said code bits for decoding the data block.

13. An integrated circuit of claim 12 wherein said decode circuitry includes buffer means connected to said read means for providing true and complemented versions of said data read from said memory, and a gate means connected to said buffer means and responsive to said code bits for transmitting either said true version or said complemented version of said data.

14. An integrated circuit of claim 13 wherein said memory includes a bit-defect map means for specifying the location and state of said memory cells having said at least one bit defect, and said code means includes means for comparing said data blocks to said bit-defect map for coding said data blocks and generating said code bits.

15. A method of processing data bits in a digital circuit having a memory with a plurality of memory cells, a first group of said memory cells capable of being set into two stable states, and a second group of said memory cells having at least one bit defect such that said memory cells are capable of being set into only one of either of said two stable states, said method comprising the steps of:
   storing a data structure of said memory specifying the location and state of said memory cells of the second group;
   reading a block of data, said block having a plurality of bits;
   determining whether a memory cell of the second group is among the memory cells to which the block of data is to be loaded;
   comparing the contents of said block of data to said data structure of said memory;
   coding said block of data such that said bits to be loaded at said at least one bit defect matches the state of said memory cell containing said bit defect;
   generating code bits capable of decoding said blocks of data; and
   loading said blocks of data and said code bits into said memory.

16. The method of claim 15 wherein said coding step includes inverting said bits of said data blocks such that said bits to be loaded at said at least one bit defect match the state of said memory cells containing said at least one bit defect.

17. The method of claim 16 wherein said loading step includes loading said blocks of data and said code bits into memory segments such that each said memory segment has no more than one of said at least one bit defect.

18. The method of claim 17 further including the step of accessing said memory to read said blocks of data loaded in said memory.

19. The method of claim 18 wherein said accessing step includes decoding said blocks of data in accordance with said code bits by providing true and complemented versions of said blocks of data read from said memory, and transmitting either said true version or said complemented version in response to said code bits.

* * * * *